United States Patent
Butler et al.

(10) Patent No.: US 11,349,285 B2
(45) Date of Patent: May 31, 2022

(54) CUT RESISTANT KNIFE

(71) Applicant: ButlerBilt L.L.C., Flat Rock, MI (US)

(72) Inventors: Michael Butler, Flat Rock, MI (US); John Lambert, Newport, MI (US)

(73) Assignee: ButlerBilt L.L.C., Flat Rock, MI (US)

( * ) Notice: Subject to any disclaimer, the term of this patent is extended or adjusted under 35 U.S.C. 154(b) by 0 days.

(21) Appl. No.: 17/162,021

(22) Filed: Jan. 29, 2021

(65) Prior Publication Data

US 2021/0242670 A1    Aug. 5, 2021

Related U.S. Application Data

(60) Provisional application No. 62/967,835, filed on Jan. 30, 2020.

(51) Int. Cl.
*H02G 1/12* (2006.01)

(52) U.S. Cl.
CPC .................. *H02G 1/1217* (2013.01)

(58) Field of Classification Search
CPC .... H02G 1/1217; H02G 1/1236; H01B 5/006; Y10T 83/9193; Y10T 83/664; B26D 3/001; B26D 7/02; B26D 2007/013
USPC ......... 83/870, 431, 950, 861, 426, 947, 881, 83/997, 924; 30/90.4, 91.1; 81/9.4, 9.44
See application file for complete search history.

(56) References Cited

U.S. PATENT DOCUMENTS

| | | | | |
|---|---|---|---|---|
| 1,540,938 A * | 6/1925 | Gordon | .................. | B23D 79/00 30/169 |
| 2,120,398 A * | 6/1938 | Paulg | .................. | H02G 1/1229 30/90.6 |
| 4,934,219 A * | 6/1990 | Edwards | ................ | G02B 6/245 30/90.1 |
| 5,257,459 A * | 11/1993 | Goodson | .............. | H02G 1/1204 30/313 |
| 6,694,853 B2 * | 2/2004 | Adams | ................. | H01B 15/006 83/870 |
| 2010/0319199 A1 * | 12/2010 | Mullaney | ............. | G02B 6/4497 30/91.1 |
| 2011/0010944 A1 * | 1/2011 | Le Dissez | .............. | G02B 6/245 30/90.4 |
| 2011/0113633 A1 * | 5/2011 | Daggett | ............... | H02G 1/1229 30/91.2 |

FOREIGN PATENT DOCUMENTS

KR       1652663 B1 *  1/2016  .......... H02G 1/1226

* cited by examiner

*Primary Examiner* — Ghassem Alie
(74) *Attorney, Agent, or Firm* — MacMillan, Sobanski & Todd, LLC

(57) ABSTRACT

A cut resistant knife, and a method for stripping jacket or sheathing off of a cable, are described.

19 Claims, 6 Drawing Sheets

CUT RESISTANT KNIFE

RELATED APPLICATIONS

This application claims priority to U.S. Provisional Application No. 62/967,835 filed under 35 U.S.C. § 111(b) on Jan. 30, 2020, the disclosure of which is incorporated herein by reference in its entirety.

BACKGROUND

Power cables and telecommunications cables often include a jacket made of a plastic or rubber material that needs to be removed in certain circumstances. However, conventional tools used to strip the jacket off of cables may pose safety issues. For example, a user may cut themselves performing such a task with a conventional knife if the knife slips out of place. Therefore, there is a need in the art for new and improved tools and methods for removing jacket from cables.

SUMMARY

Provided is a cut resistant knife comprising at least one handle; a guard member connected to the at least one handle, wherein the guard member comprises a top guard and a front guard extending from a first end to a second end, defining a slot between the top guard and the front guard, wherein the at least one handle is connected to the first end; and a blade connected to the guard member and facing the front guard, wherein the blade is angled so as to define a sharp edge oriented away from the top guard, and wherein a cutting aperture is defined between the front guard and the blade.

In certain embodiments, the at least one handle is removable from the guard member. In certain embodiments, the at least one handle comprises knurls or other grip-enhancing features. In certain embodiments, the cut resistant knife further comprises a second handle attached to the second end. In particular embodiments, the second handle is removable. In particular embodiments, the second handle comprises knurls or other grip-enhancing features.

In certain embodiments, the front guard and the blade are disposed in a substantially parallel manner. In certain embodiments, the front guard and the blade are disposed in a substantially planar manner.

In certain embodiments, the slot is sized to receive jacket or sheathing stripped from a cable. In certain embodiments, the cutting aperture is sized to receive jacket or sheathing stripped from a cable.

In certain embodiments, the guard member comprises a metal, an alloy, a hard plastic, or a combination thereof. In certain embodiments, the guard member comprises aluminum or steel.

In certain embodiments, the blade comprises a metal or alloy. In certain embodiments, the blade comprises A2 grade tool steel that has been double heat treated.

In certain embodiments, the front guard and the blade define a plane, and the sharp edge of the blade is oriented about $1/16^{th}$ of an inch offset from the plane.

In certain embodiments, the guard member defines a front side and a rear side, and the slot extends from the front side to the rear side.

Further provided is a cut resistant knife comprising a first handle and a second handle; a guard member extending between the first handle and the second handle; a top guard extending from a first end of the guard member to a second end of the guard member; a front guard extending from the first end to the second end, wherein a slot is defined between the top guard and the front guard; and a blade extending from the first end to the second end, wherein the blade defines a sharp edge facing the front guard, and wherein a cutting aperture is defined between the front guard and the blade.

In certain embodiments, the first handle and/or the second handle comprises knurls or other grip-enhancing features. In certain embodiments, the first handle and/or the second handle is removable from the guard member.

In certain embodiments, the front guard and the blade are disposed in a substantially parallel manner. In certain embodiments, the front guard and the blade are disposed in a substantially planar manner.

In certain embodiments, the slot is sized to receive jacket or sheathing stripped from a cable. In certain embodiments, the cutting aperture is sized to receive jacket or sheathing stripped from a cable.

In certain embodiments, the guard member comprises a metal, an alloy, a hard plastic, or a combination thereof. In certain embodiments, the guard member comprises aluminum or steel.

In certain embodiments, the blade comprises a metal or alloy. In certain embodiments, the blade comprises A2 grade tool steel that has been double heat treated.

In certain embodiments, the front guard and the blade define a plane, and the sharp edge of the blade is oriented about $1/16^{th}$ of an inch offset from the plane.

Further provided is a method for stripping jacket off of a cable, the method comprising pulling or pushing a cut resistant knife along a surface of a cable having jacket thereon to strip the jacket off of the cable with a blade of the cut resistant knife, wherein access to a sharp edge of the blade is restricted by a guard member on the cut resistant knife.

Further provided is a fixed or non-fixed bladed tool comprising a guard member and a blade, wherein the blade is configured to be disposed on a cable while the guard member restricts access to the blade.

BRIEF DESCRIPTION OF THE DRAWINGS

The patent or application file may contain one or more drawings executed in color and/or one or more photographs. Copies of this patent or patent application publication with color drawing(s) and/or photograph(s) will be provided by the U.S. Patent and Trademark Office upon request and payment of the necessary fees.

DETAILED DESCRIPTION

Figure 1:
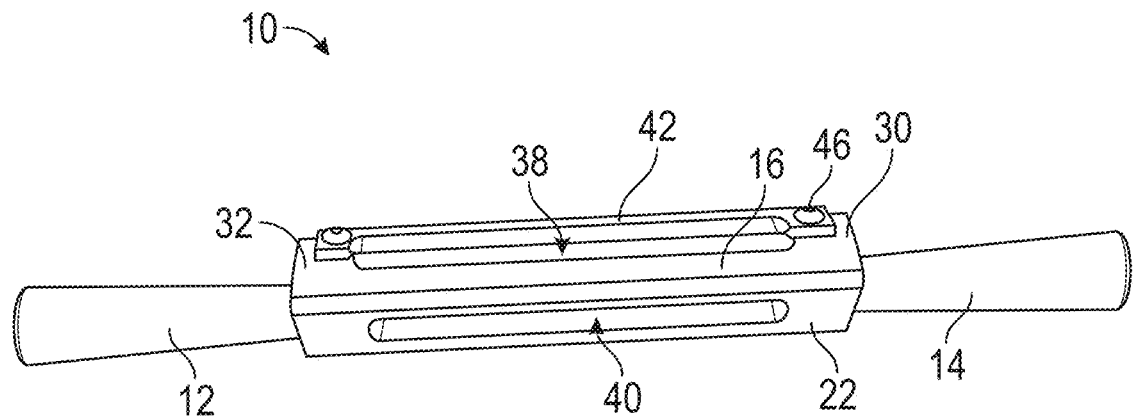
FIG. 1: Top perspective view of an embodiment of a cut resistant knife in accordance with the present disclosure.
Figure 2:
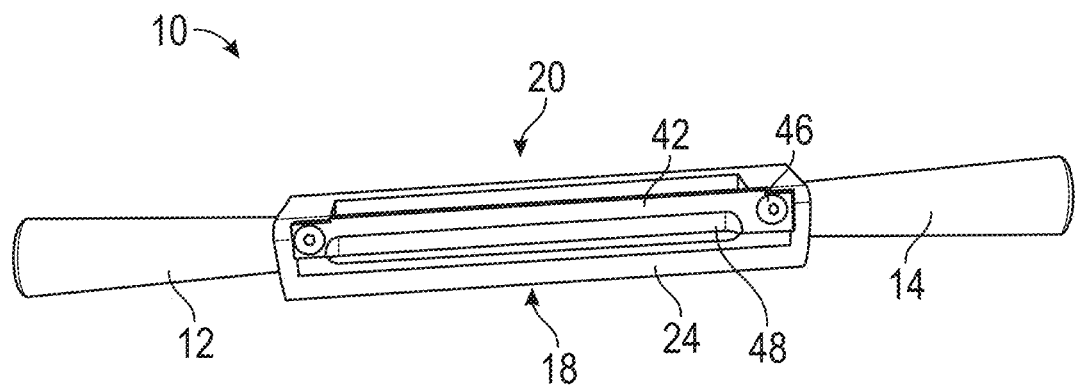
FIG. 2: Botton view of an embodiment of a cut resistant knife in accordance with the present disclosure.
Figure 3:
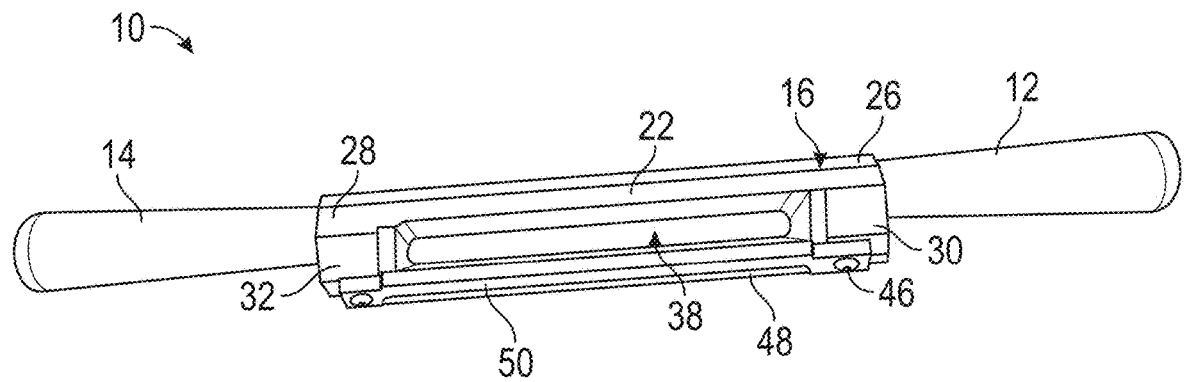
FIG. 3: Rear view of an embodiment of a cut resistant knife in accordance with the present disclosure.
Figure 4:
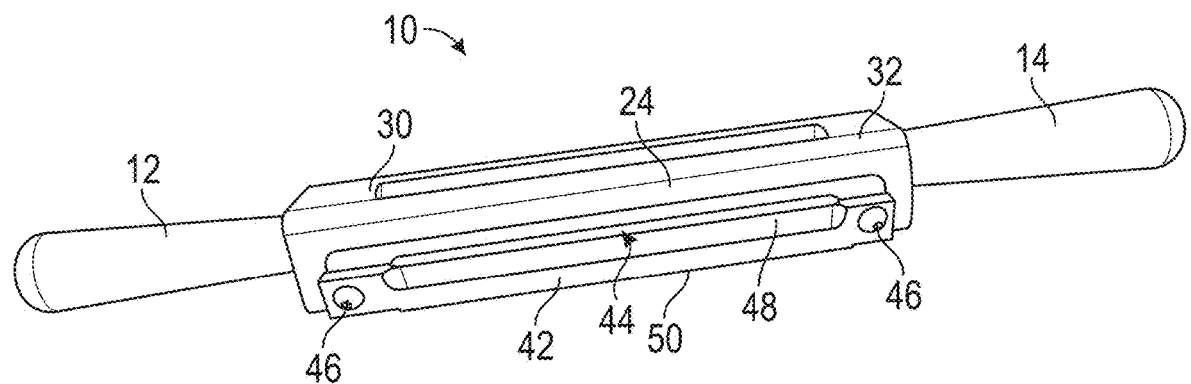
FIG. 4: Perspective view of an embodiment of a cut resistant knife in accordance with the present disclosure.
Figure 5:
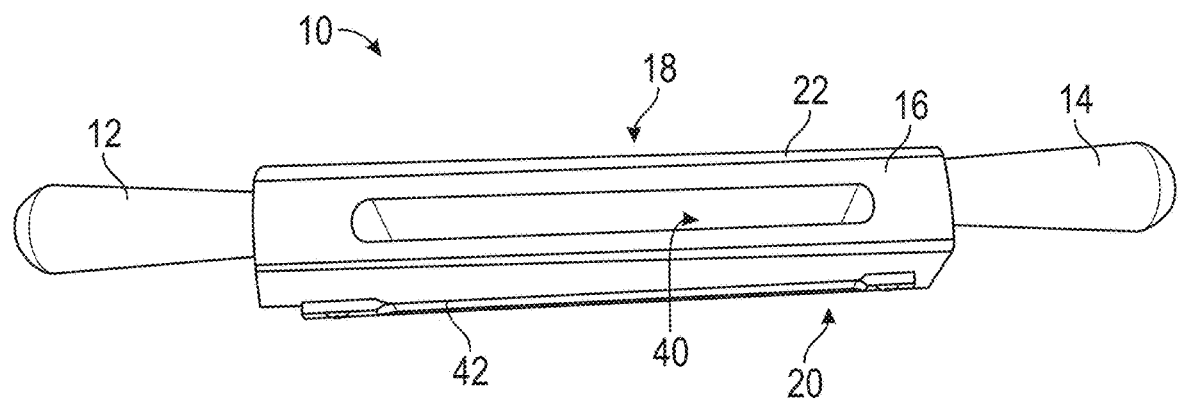
FIG. 5: Front view of an embodiment of a cut resistant knife in accordance with the present disclosure.
Figure 6:
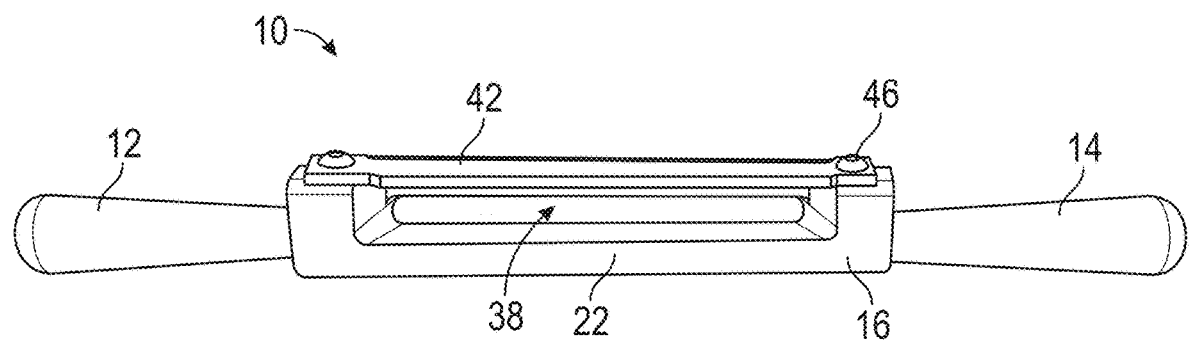
FIG. 6: Rear view of an embodiment of a cut resistant knife in accordance with the present disclosure.

Throughout this disclosure, various publications, patents, and published patent specifications are referenced by an identifying citation. The disclosures of these publications, patents, and published patent specifications are hereby incorporated by reference into the present disclosure in their entirety to more fully describe the state of the art to which this invention pertains.

Provided herein is a cut resistant knife. By "cut resistant", it is meant that the knife includes one or more safety features to prevent or avoid the accidental cutting of users. The term "cut resistant" does not mean that the knife is in any way deficient in its ability to cut materials in the proper manner. The cut resistant knife is capable of stripping cable in a way where the user is protected by a guard member in the event that the knife slips. Thus, the cut resistant knife provides enhanced safety while usable to perform a cutting task.

Referring now to FIGS. 1-10, the cut resistant knife 10 may include a first handle 12 and a second handle 14, with a guard member 16 extending between the first handle 12 and the second handle 14. The cut resistant knife 10 includes a front side 18 and a rear side 20, which can be seen by viewing the cut resistant knife 10 from an orthogonal perspective relative to the first handle 12 and the second handle 14. In some embodiments, the cut resistant knife 10 has only one handle 12, and the guard member 16 extends from the one handle 12 to a terminal end of the cut resistant knife 10. In other embodiments, the cut resistant knife 10 includes two handles 12, 14, either or both of which may be removable from the guard member 16. The handles 12, 14 may be made of any suitable material including, but not limited to, metals, alloys, plastics, and combinations thereof.

Referring still to FIGS. 1-10, the guard member 16 is an elongated section having a top guard 22 and a front guard 24 that may define a variety of shapes. In some embodiments, seen for example in FIGS. 7-10, the guard member 16 includes a top guard 22 that is curved. In other embodiments, seen for example in FIGS. 1-6, the guard member includes a straight (i.e., not curved) top guard 22. Regardless of shape, the guard member 16 generally includes a first end 26 and a second end 28, where the top guard 22 and the front guard 24 both extend from the first end 26 to the second end 28. The front guard 24 is on the front side 18 of the cut resistant knife 10. The first and second ends 26, 28 may include a first base member 30 and a second base member 32, respectively, extending between the front guard 24 and the top guard 22. It is understood, however, that the base members 30, 32, the top guard 22, and the front guard 24 may all be formed from a single piece of material. In other words, the base members 30, 32, the top guard 22, and the front guard 24, or any two of these three components, may be of unitary construction. Furthermore, in some embodiments, the guard member 16 and one or both of the handles 12, 14 are of unitary construction, formed from the same piece of material. Suitable materials for forming the guard member 16 and any of its components include, but are not limited to, metals such as aluminum, alloys such as steel, hard plastics, or combinations thereof.

Referring still to FIGS. 1-10, the guard member 16 defines a front side 34 on the front side 18 of the cut resistant knife 10 and a rear side 36 on the rear side 20 of the cut resistant knife 10. The guard member 16 includes at least one slot 38 extending from the front side 34 to the rear side 36, the purpose of which is described in more detail below. The slot 38 may be of a suitable size so as to receive a cable jacket to be stripped or cut by the cut resistant knife 10. In embodiments in which the top guard 22 is curved, the slot 38 may be formed through the top guard 22. In embodiments in which the top guard 22 is straight, the slot 38 may simply be formed by the space between the top guard 22 and the front guard 24 between the base members 30, 32, as seen for example in FIG. 3. In embodiments in which the guard member 16 includes a straight top guard 22, the guard member 16 may further include a second slot 40 in the top guard 22, as seen for example in FIG. 1.

Referring still to FIGS. 1-10, a blade 42 may extend from the first end 26 of the guard member 16 to the second end 28 of the guard member 16. The blade 42 may be disposed substantially parallel to and/or substantially planar with the front guard 24, with a cutting aperture 44 defined between the blade 42 and the front guard 24, the purpose of which will be described in more detail below. The blade 42 may be attached to the guard member 16 at the base members 30, 32 with suitable fasteners 46, and may be easily detachable from the guard member 16, for instance for safer storage of the cut resistant knife 10 without the blade 42. The blade 42 may be angled slightly so as to define a sharp edge 48 generally facing the front guard 24 but also angled downward relative to (i.e., away from) the top guard 22. The sharp edge 48 may be only slightly angled downward. In one non-limiting example, the sharp edge 48 is $1/16^{th}$ of an inch offset from (below, relative to the top guard 22) the plane defined by the blade 42 and the front guard 24. Advantageously, the angle of the blade 42 may allow for the cutting of jacket on a cable but not the cutting of a user holding the cut resistant knife 10. The blade 42 may include a side 50 opposing the sharp edge 48 that is blunt, as seen for example in FIG. 3. The blunt side 50 of the blade 42 is on the rear side 18 of the cut resistant knife 10. The blade 42 may be made of any suitable metal or alloy capable of being sharpened and honed. In one non-limiting example, the blade 42 is made from A2 grade tool steel that has been double heat treated.

The guard member 16 effectively acts to shield a user's hand (or other body parts) from the sharp edge 48 of the blade 42 in the event that the cut resistant knife 10 slips out of place while being used. The guard member 16 restricts access to the sharp edge 48 of the blade 42 from multiple angles. Both the top guard 22 and the front guard 24 act to guard against accidental cuts, preventing exposure to the sharp edge 48 of the blade 42 from the top and front, respectively. The blunt side 50 of the blade 42 protects a user from the rear, and the subtle angle of the blade protects a user from below the cut resistant knife 10. Thus, in some embodiments, the cut resistant knife 10 has safety features to guard against accidental cutting of a user from every side.

As noted above, a cutting aperture 44 is defined by the space between the front guard 24 and the blade 42. The cutting aperture 44 is where a material to be cut may be exposed to the sharp edge 48 of the blade 42 for cutting. The cut resistant knife 10 may be moved in a direction indicated by the double sided arrows in FIG. 10 so as to scrape the blade 42 along the surface of the material to be cut. The angle of the blade 42, which directs the blade 42 slightly into the material, causes the material to be cut and to enter the cutting aperture 44. The sliding motion of the cut resistant knife 10 then causes the material to exit through the slot 38, as seen in FIG. 10.

Figure 7:
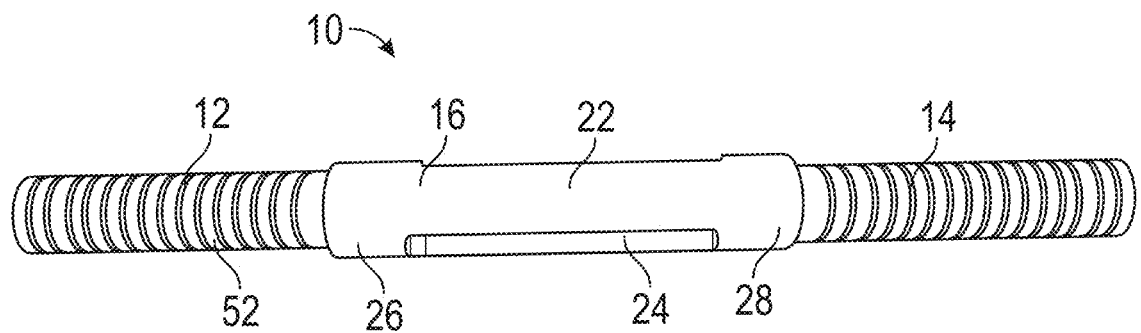
FIG. 7: Side view of an embodiment of a cut resistant knife having removable handles.
Figure 8:
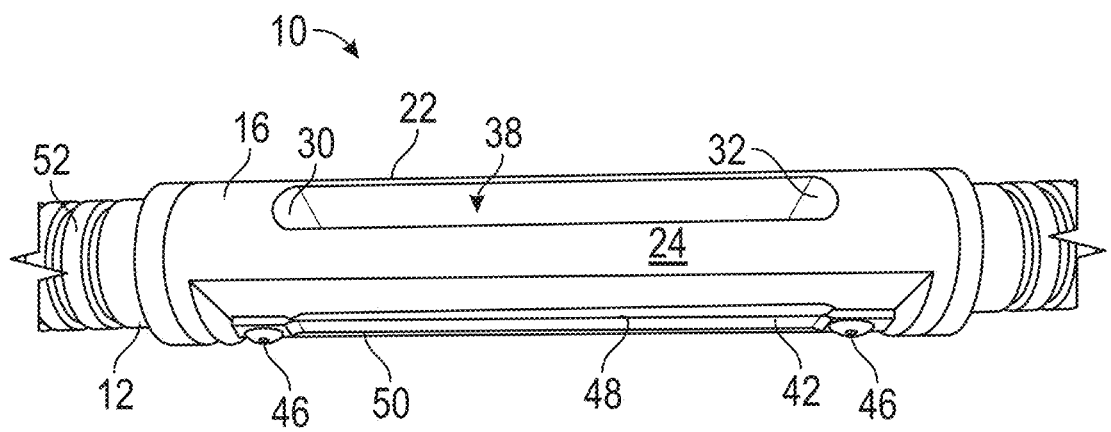
FIG. 8: Zoomed in side view of the embodiment of the cut resistant knife depicted in FIG. 7.
Figure 9:
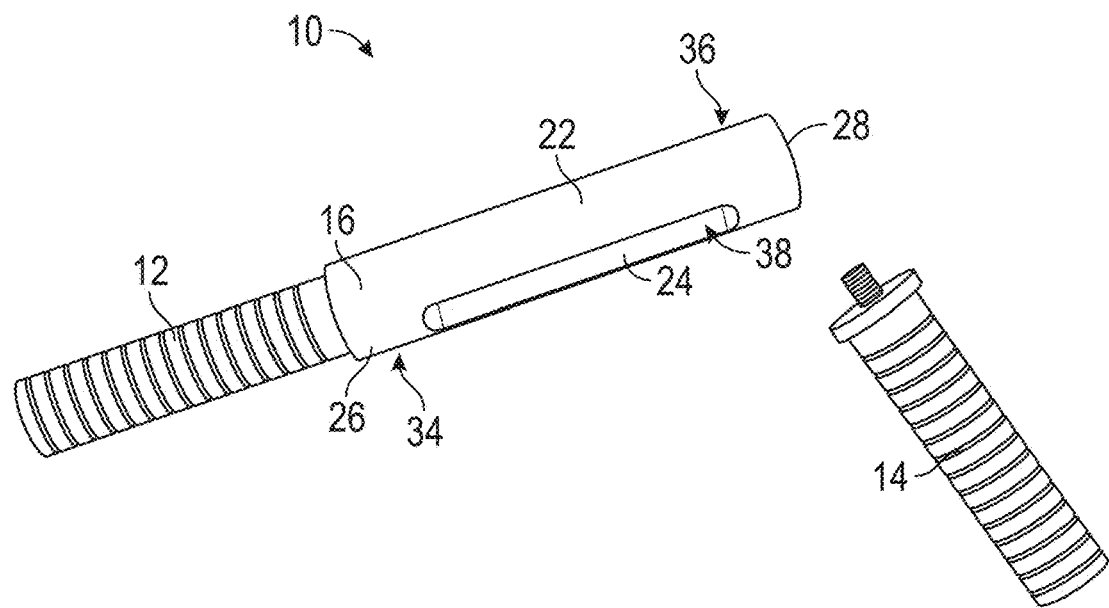
FIG. 9: Perspective view of the embodiment of the cut resistant knife depicted in FIG. 7 with a handle removed.

Referring now to FIGS. 7-9, an embodiment of a cut resistant knife 10 having removable handles 12, 14 is depicted. As seen in FIGS. 7-9, the handles 12, 14 may be generally tubular in shape, and may include knurls 52 or other features that improve grip on the handles 12, 14. The handles 12, 14 may be attached to the guard member 24 by mating threads so as to be attachable and removable by rotating the respective handle relative to the guard member. However, other methods for attaching and removing the handles 12, 14 to and from the guard member 16 are possible and entirely encompassed within the scope of the present disclosure. FIG. 9 depicts the cut resistant knife 10 with one of the handles 12, 14 removed.

Figure 10:
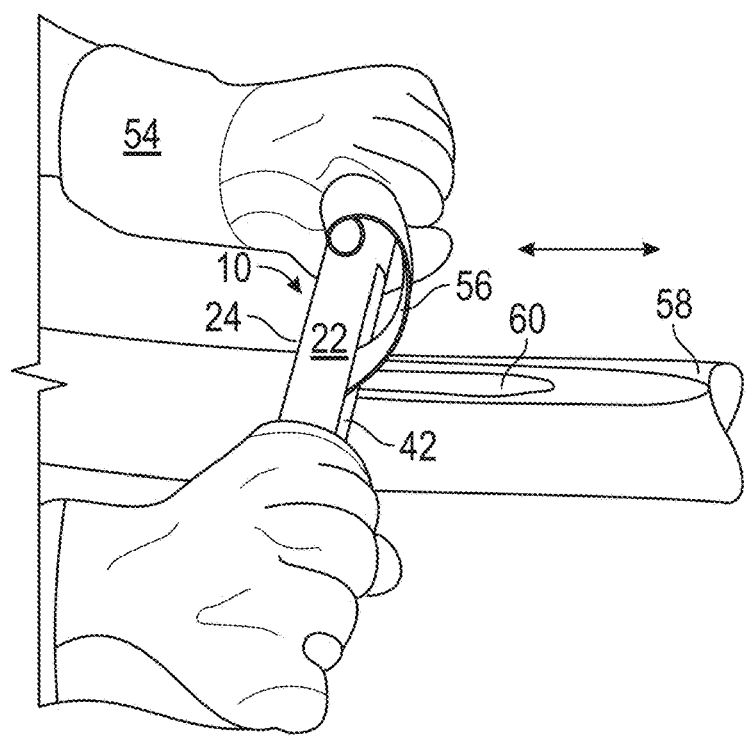
FIG. 10: Illustration of a non-limiting example use of an embodiment of a cut resistant knife to remove the jacket from an electrical cable.
Figure 11:
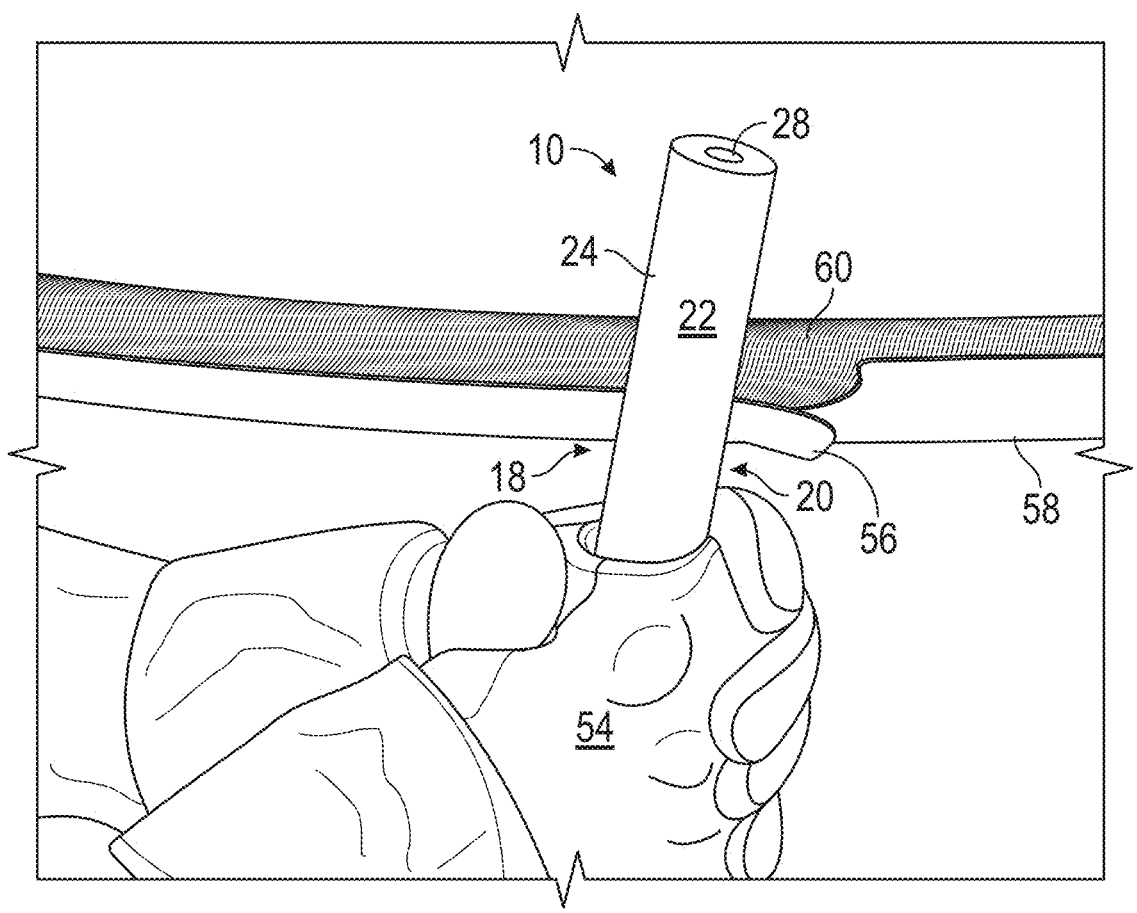
FIG. 11: Illustration of a non-limiting example use of an embodiment of a cut resistant knife to remove the jacket from an electrical cable.

Referring now to FIGS. 10-11, a user 54 stripping jacket 56 off of a power cable 58 with a cut resistant knife 10 is shown. FIG. 10 shows an embodiment of the cut resistant knife 10 having two handles 12, 14, and FIG. 11 shows an embodiment of the cut resistant knife 10 having only one handle, which is not seen in the figure because the hand of the user 54 is covering it. The cut resistant knife 10 may be utilized to remove the jacket 56 from any power cable 58 (e.g., ethylene propylene rubber cable or cross-linked polyethylene cable), telecommunications cable, or the like. The user 54 may hold the cut resistant knife 10 with one or both hands, and may pull and/or push (depending on the orientation of the cut resistant knife 10 in the user's hands) so as to remove the jacket 56 from the cable 58. As seen in FIG. 10, the cutting aperture 44 and slot 38 allow a user 54 to skin a jacket 56 off of a cable 58 and provide a space for the jacket 56 to exit, leaving behind skinned cable 60. The jacket 56 being stripped off enters the guard member 16 through the cutting aperture 44 and exits through the slot 38 between the blade 42 and the guard member 16. The user 54 is protected from the sharp edge 48 of the blade 42 in the event of a slippage of the cut resistant knife 10 by the guard member 16.

Certain embodiments of the cut resistant knife and methods disclosed herein are defined in the above examples. It should be understood that these examples, while indicating particular embodiments of the invention, are given by way of illustration only. From the above discussion and these examples, one skilled in the art can ascertain the essential characteristics of this disclosure, and without departing from the spirit and scope thereof, can make various changes and modifications to adapt the cut resistant knife and methods described herein to various usages and conditions. Various changes may be made and equivalents may be substituted for elements thereof without departing from the essential scope of the disclosure. In addition, many modifications may be made to adapt a particular situation or material to the teachings of the disclosure without departing from the essential scope thereof.

What is claimed is:

1. A method for stripping jacket off of a cable, the method comprising pulling or pushing a cut resistant knife along a surface of a cable having jacket thereon to strip the jacket off of the cable with a blade of the cut resistant knife;
    wherein access to the blade is restricted by a guard member on the cut resistant knife;
    wherein the guard member comprises a top guard and a front guard extending from a first end to a second end, defining a slot between the top guard and the front guard;
    wherein the blade connected to an outside surface of the guard member and facing the front guard;
    wherein the blade is parallel with an outside surface of the front guard;
    wherein the elongated blade is angled so as to define a sharp edge oriented away from the top guard;
    wherein a cutting aperture is defined between the front guard and the elongated blade;
    wherein a sharp edge of the blade is exposed within the cutting aperture; and
    wherein the blade is configured to engage a jacket of a cable such that when pulled in the direction of the sharp edge of the blade, the cut resistant knife removes a portion of the jacket, such that the removed portion of the jacket enters the guard member through the cutting aperture and exits the guard member through the slot.

2. A cut resistant knife comprising:
    at least one handle;
    a guard member connected to the at least one handle, wherein the guard member comprises a top guard and a front guard extending from a first end to a second end, defining a slot between the top guard and the front guard, wherein the at least one handle is connected to the first end; and
    an elongated blade connected to an outside surface of the guard member and facing the front guard;
    wherein the elongated blade is parallel with an outside surface of the front guard;
    wherein the elongated blade is angled so as to define a sharp edge oriented away from the top guard;
    wherein a cutting aperture is defined between the front guard and the elongated blade;
    wherein the sharp edge of the elongated blade is exposed within the cutting aperture; and
    wherein the elongated blade is configured to engage a jacket of a cable such that when pulled in the direction of the sharp edge of the elongated blade, the cut resistant knife removes a portion of the jacket, such that the removed portion of the jacket enters the guard member through the cutting aperture and exits the guard member through the slot.

3. The cut resistant knife of claim 2, wherein the at least one handle is removable from the guard member.

4. The cut resistant knife of claim 2, wherein the at least one handle comprises knurls.

5. The cut resistant knife of claim 2, further comprising a second handle attached to the second end.

6. The cut resistant knife of claim 5, wherein the second handle is removable.

7. The cut resistant knife of claim 5, wherein the second handle comprises knurls.

8. The cut resistant knife of claim 2, wherein the guard member defines a front side and a rear side, and the slot extends from the front side to the rear side.

9. The cut resistant knife of claim 2, wherein the top guard is curved.

10. A cut resistant knife comprising:
    a first handle and a second handle;
    a guard member extending between the first handle and the second handle;
    a top guard extending from a first end of the guard member to a second end of the guard member;
    a front guard extending from the first end to the second end, wherein a slot is defined between the top guard and the front guard; and
    an elongated blade extending from the first end to the second end;

wherein the elongated blade defines a sharp edge facing the front guard;

wherein a cutting aperture is defined between the front guard and the sharp edge of the elongated blade; and wherein the elongated blade is configured to engage a jacket of a cable such that when pulled in the direction of the sharp edge of the elongated blade, the cut resistant knife removes a portion of the jacket, such that the removed portion of the jacket enters the guard member through the cutting aperture and exits the guard member through the slot.

11. The cut resistant knife of claim 10, wherein the top guard is curved.

12. The cut resistant knife of claim 10, wherein the first handle and/or the second handle comprises knurls.

13. The cut resistant knife of claim 10, wherein the first handle and/or the second handle is removable from the guard member.

14. The cut resistant knife of claim 10, wherein the front guard and the blade are disposed in a substantially parallel manner.

15. The cut resistant knife of claim 10, wherein the slot is sized to receive jacket or sheathing stripped from a cable.

16. The cut resistant knife of claim 10, wherein the cutting aperture is sized to receive jacket or sheathing stripped from a cable.

17. The cut resistant knife of claim 10, wherein the guard member comprises aluminum or steel.

18. The cut resistant knife of claim 10, wherein the blade comprises A2 grade tool steel that has been double heat treated.

19. The cut resistant knife of claim 10, wherein the front guard and the blade define a plane, and the sharp edge of the blade is oriented about $1/16^{th}$ of an inch offset from the plane.

* * * * *